United States Patent [19]
Masutani et al.

[11] Patent Number: 5,429,782
[45] Date of Patent: Jul. 4, 1995

[54] PROCESS FOR PRODUCING POLYTETRAFLUOROETHYLENE MOLDED ARTICLE

[75] Inventors: Noboru Masutani; Junichi Nakazono; Toshihiko Shinomura, all of Osaka, Japan

[73] Assignee: Nitto Denko Corporation, Osaka, Japan

[21] Appl. No.: 161,263

[22] Filed: Dec. 3, 1993

[30] Foreign Application Priority Data

Dec. 15, 1992 [JP] Japan .................. 4-334486

[51] Int. Cl.⁶ .................................. B29C 43/10
[52] U.S. Cl. ............................ 264/127; 264/570
[58] Field of Search .................... 264/127, 570

[56] References Cited

U.S. PATENT DOCUMENTS

| | | | |
|---|---|---|---|
| 4,102,966 | 7/1978 | Duperray et al. | 264/112 |
| 4,623,505 | 11/1986 | Traut | 264/570 |
| 4,942,007 | 7/1990 | Kunimoto et al. | 264/122 |
| 4,997,608 | 3/1991 | Haldeman et al. | 264/120 |
| 5,032,335 | 7/1991 | Wilson | 264/113 |

Primary Examiner—Mary Lynn Theisen
Attorney, Agent, or Firm—Sughrue, Mion, Zinn, Macpeak & Seas

[57] ABSTRACT

A process for producing a polytetrafluoroethylene molded article by isostatic molding is disclosed, the isostatic molding being conducted under a high pressure of from 1,500 to 10,000 kg/cm². The resulting molded article is isotropic as regards coefficient of thermal expansion and exhibits improved frictional resistance.

3 Claims, 1 Drawing Sheet

PROCESS FOR PRODUCING POLYTETRAFLUOROETHYLENE MOLDED ARTICLE

FIELD OF THE INVENTION

The present invention relates to a process for producing a polytetrafluoroethylene (hereinafter abbreviated as "PTFE") molded article.

BACKGROUND OF THE INVENTION

PTFE molded articles are excellent in heat resistance, resistance to chemicals and low frictional properties and have been widely used as chemical plant parts, domestic goods with a non-tacky coat, medical parts, etc.

In recent years, PTFE molded articles have been attracting attention as a sliding part integrated into a hydraulic device or a compressor, such as a bush, a piston ring, a seal ring, etc.

Conventional processes for producing a PTFE molded article include compression molding comprising charging PTFE powder in a cylindrical mold and pressing the powder from one direction at room temperature to bond the powder to each other (see *PLASTIC ZAIRYO KOZA* (6) *FUSSO JUSHI* (Fluorine Resin), pp. 58–69, Nikkan Kogyo Shinbunsha (1981)) and isostatic molding comprising charging PTFE powder between a mold and an elastic mold and pressing the powder by fluid pressure from every direction via the elastic mold to bond the particles to each other. The isostatic molding is also disclosed in Japanese Patent Publication No. 43-21984. The accepted molding pressure to be used in compression molding and isostatic molding usually ranges from about 100 to 1,000 kg/cm$^2$ and from about 50 to 1,000 kg/cm$^2$, respectively. Either of these techniques involves a sintering step in which the molded article is heated to a temperature above the melting point of PTFE. The resulting sintered molded article may be cut to shape and size by means of a lathe, etc.

It is preferable for some of the above-described uses that a PTFE molded article should have the same or approximately the same coefficient of thermal expansion in every direction. If the coefficient of thermal expansion of a molded article greatly varies depending on the direction, the molded article expands to a specific direction with a rise in temperature when used as an integral part of a hydraulic device or a compressor, causing abnormal friction or reduction in sealing performance. Further, a PTFE molded article is demanded to have frictional resistance for some uses.

However, a molded article obtained by compression molding is ought to have a largely varying coefficient of linear expansion depending on the direction (i.e., anisotropy), which is attributed to the unidirectional pressing. The frictional resistance of the molded article is not so high as expected.

On the other hand, a molded article obtained by isostatic molding is preferred as having the same or approximately the same coefficient of linear expansion for every direction (i.e., isotropy) but still has room for improvement in frictional resistance.

SUMMARY OF THE INVENTION

As a result of extensive investigations to overcome the above-described problems associated with the conventional techniques, it has been found that a PTFE molded article which is isotropic as regards coefficient of linear expansion and has improved frictional resistance can be obtained by increasing the molding pressure in isostatic molding to such a high level that has been left out of consideration from the generally received knowledge. The present invention has been completed based on this finding.

Accordingly, an object of the present invention is to provide a process for producing a PTFE molded article.

The process for producing a PTFE molded article according to the present invention comprises molding PTFE powder by isostatic molding under a high pressure of from 1,500 to 10,000 kg/cm$^2$ and sintering the molded article.

BRIEF DESCRIPTION OF THE DRAWING

The FIGURE shows an isostatic molding apparatus which can be used to conduct the present invention.

DETAILED DESCRIPTION OF THE INVENTION

Figure 1:
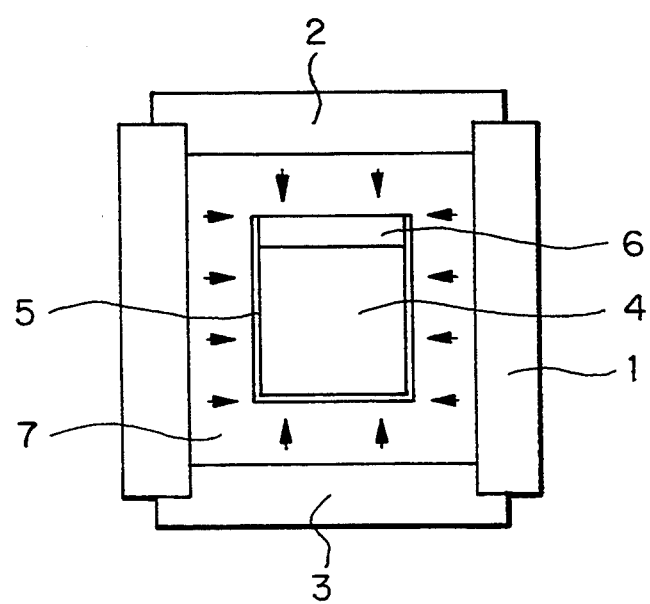

In the present invention, PTFE powder is molded by isostatic molding. The isostatic molding comprises charging PTFE powder in a mold having an elastic body and applying a fluid pressure from every direction via the elastic body to bond the powder to each other.

Isostatic molding can be conducted using, for example, an apparatus shown in the FIGURE. In the FIGURE, numeral 1 is a cylindrical mold (or a pressure-resistant vessel) having upper cover 2 and lower cover 3. In mold 1 is placed cylindrical elastic body 5 made of, for example, rubber with its lower part closed, in which PTFE powder 4 is packed. The upper part of elastic body 5 is closed with stopper 6. Pressurized fluid 7 (liquid or gas) is fed to mold 1. The pressure of pressurized fluid 7 is transmitted to PTFE powder from every direction via elastic body 5 thereby bonding the powder to each other to produce a molded article.

Isostatic molding apparatus which can be used in the present invention are not limited to the type shown in the FIGURE. For example, PTFE powder may be packed between a mold and an elastic body concentrically placed in the mold. In this case, the elastic body is expanded by a fluid pressure to press the powder from every direction via the elastic body thereby bonding the powder to each other.

It is essential in the present invention to set the fluid pressure within a range of from 1,500 to 10,000 kg/cm$^2$, and preferably from 2,000 to 10,000 kg/cm$^2$. The fluid pressure used in the present invention is far higher than the highest adopted in a conventional isostatic molding technique, i.e., about 1,000 kg/cm$^2$. The present invention is characterized by such a high pressure condition far from the conventionally used molding pressure. For some unknown reasons, use of such a high pressure makes it possible to obtain a molded article with excellent frictional resistance as demonstrated in Examples hereinafter given.

In one embodiment of the present invention, the resulting molded article is removed from the molding apparatus and then sintered by heating at a temperature of, for example, from 350° to 400° C. to obtain a sintered molded article. The sintering time is usually from about 2 to 20 hours, while varying depending on the wall thickness of the molded article or the sintering temperature. If necessary, the sintered molded article may be cut to size and shape by means of a lathe, etc.

In another embodiment of the present invention, isostatic molding of PTFE powder can be conducted under a pressure of from 1,500 to 10,000 kg/cm$^2$ while performing sintering at a temperature of the melting point or more of PTFE. By setting the molding temperature as above, molding and sintering can be effected simultaneously. In this embodiment, after the high temperature and high pressure condition is maintained for a prescribed period of time (e.g., about 2-20 hours) to accomplish sintering, the whole molding apparatus is cooled, and the sintered molded article is removed therefrom. Heating can be effected through the pressurized fluid heated to that temperature. For ease of heating, a gaseous medium is preferred as a fluid.

If desired, the PTFE powder to be molded may contain fillers for various purposes. For instance, glass fiber, carbon fiber, aramid fiber, alumina fiber, boron fiber, glass beads, silicon carbide whisker, silicon nitride whisker, and potassium titanate whisker may be added for reinforcing. Graphite, molybdenum disulfide, tungsten disulfide, boron nitride, mica, aromatic polyester resins, silicone resins, calcium fluoride, graphite fluoride, glass flakes, carbon black, and bronze may be added for improvement in sliding properties. Powders, flakes or fibers of various metals may be added for imparting electric conductivity. Beryllium oxide, aluminum nitride, alumina, magnesia, and titania may be added for improvement in thermal conductivity. Silica gel, zeolite, talc, bentonite, and potassium titanate may be added for imparting adsorptivity. Calcium carbonate, barium titanate, kaolin, and clay may be used as functional fillers. While not limiting, the compounding ratio of these fillers is generally in the range of from 1 to 30 parts by weight per 100 parts by weight of PTFE powder with molding properties and the like being taken into consideration.

If desired, PTFE powder may be used in combination with other fluorine resins, such as a tetrafluoroethylene-hexafluoropropylene copolymer, a tetrafluoroethylene-perfluoroalkyl vinyl ether copolymer, an ethylene-tetrafluoroethylene copolymer, polychlorotrifluoroethylene, and an ethylene-chlorotrifluoroethylene copolymer. These fluorine resin powders are generally used in an amount of about 100 parts by weight or less per 100 parts by weight of PTFE powder.

The present invention will now be explained in greater detail with reference to Examples, but the present invention should not be construed as being limited thereto. All the parts are by weight, unless otherwise indicated.

EXAMPLE 1

PTFE powder was packed in a rubber mold having an inner diameter of 60 mm and a height of 200 mm with its lower part closed and molded by applying a pressure of 2,000 kg/cm$^2$ at room temperature for 2 minutes by means of an isostatic molding apparatus having the same structure as shown in the FIGURE. Water was used as a pressurized fluid. The resulting molded article was removed from the apparatus and sintered by heating at 370° C. for 8 hours to obtain a sintered rod having a diameter of 40 mm and a length of 130 mm (designated sample 1).

EXAMPLE 2

Two sintered rods were obtained in the same manner as in Example 1, except for changing the molding pressure to 4,000 kg/cm$^2$ and 8,000 kg/cm$^2$. The resulting molded articles were designated samples 2 and 3, respectively.

EXAMPLE 3

PTFE powder was molded in the same manner as in Example 1, except for using nitrogen gas heated at 370° C. as a pressurized fluid and placing a heater for temperature maintenance in the apparatus. After the high temperature and high pressure condition was maintained for 6 hours, the whole apparatus was allowed to cool in the atmosphere, and a sintered rod (designated sample 4) was removed therefrom.

EXAMPLE 4

Fifty parts of carbon fiber having a diameter of 7 μm and an average length of 70 μm were uniformly mixed with 450 parts of PTFE powder in a Henschel mixer. The resulting mixed powder was molded in the same manner as in Example 3 to obtain a sintered rod (designated sample 5).

EXAMPLE 5

Two sintered rods (designated samples 6 and 7) were obtained in the same manner as in Example 3, except for changing the molding pressure to 4,000 kg/cm$^2$ and 8,000 kg/cm$^2$, respectively.

COMPARATIVE EXAMPLE 1

PTFE powder was packed in a vertically set cylindrical mold having an inner diameter of 40 mm and a height of 300 mm and pressed from the upper direction under a pressure of 600 kg/cm$^2$ for 2 minutes at room temperature (compression molding). The molded article removed from the mold was sintered by heating at 370° C. for 8 hours to obtain a sintered rod having a diameter of 40 mm and a length of 130 mm (designated sample 8).

COMPARATIVE EXAMPLE 2

A sintered rod (designated sample 9) was obtained in the same manner as in Example 1, except for changing the fluid pressure to 300 kg/cm$^2$.

Each of the sintered molded articles obtained in the above Examples and Comparative Examples was cut with a lathe into a cylindrical specimen having an outer diameter of 25.4 mm, an inner diameter of 20 mm, and a height of 15 mm, and the resulting specimen was tested to obtain a coefficient of dynamic friction and to determine frictional resistance. The test was conducted in a ring-on-ring system using a Matsubara frictional wear tester under the following conditions.

Matched object: cast iron
Planar speed of sliding: 0.5 m/sec
Planar pressure: 15 kg/cm$^2$
Temperature: heated to 100° C. in the presence of a refrigerator oil The coefficient of dynamic friction is a value in a stationary state. The frictional resistance was expressed in terms of a wear (μm) of the sample height when slid for consecutive 2 hours. The results obtained are shown in the Table below.

TABLE

| Sample No. | Coefficient of Dynamic Friction | Wear (μm) |
| --- | --- | --- |
| 1 | 0.05 | 297 |
| 2 | 0.05 | 295 |
| 3 | 0.05 | 290 |
| 4 | 0.05 | 280 |
| 5 | 0.07 | 29 |
| 6 | 0.05 | 279 |
| 7 | 0.05 | 277 |
| 8 | 0.05 | 496 |
| 9 | 0.05 | 515 |

As described and demonstrated above, the PTFE molding process of the present invention adopts isostatic molding under a greatly increased pressure condition. According to the process, a PTFE molded article having improved frictional resistance while retaining low frictional properties can be obtained with ease.

While the invention has been described in detail and with reference to specific examples thereof, it will be apparent to one skilled in the art that various changes and modifications can be made therein without departing from the spirit and scope thereof.

What is claimed is:

1. A process for producing a polytetrafluoroethylene molded article comprising molding polytetrafluoroethylene powder by isostatic molding while sintering at a temperature of the melting point or more of the polytetrafluoroethylene under a high pressure of from 1,500 to 10,000 kg/cm$^2$.

2. A process as claimed in claim 1, wherein the molding pressure is from 2,000 to 10,000 kg/cm$^2$.

3. A process as claimed in claim 1, wherein the heating and pressing are effected by means of a gaseous fluid.

* * * * *